May 23, 1950 M. M. P. JORGENSEN 2,509,002
MEAT GRINDER
Filed Nov. 28, 1945 2 Sheets-Sheet 1
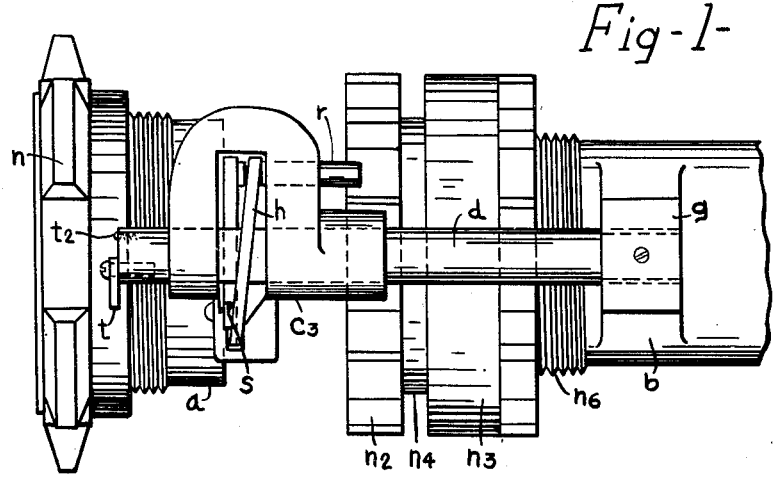
Fig-1-
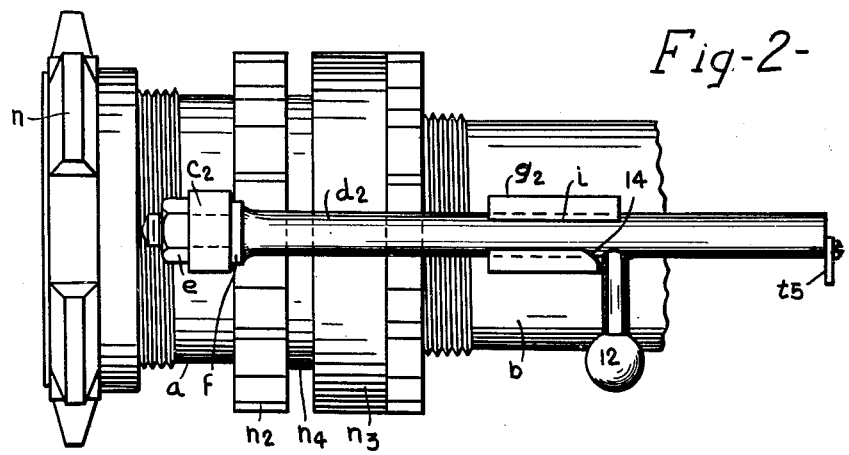
Fig-2-
INVENTOR:
MARTIN M. P. JORGENSEN,
BY
His Agent.

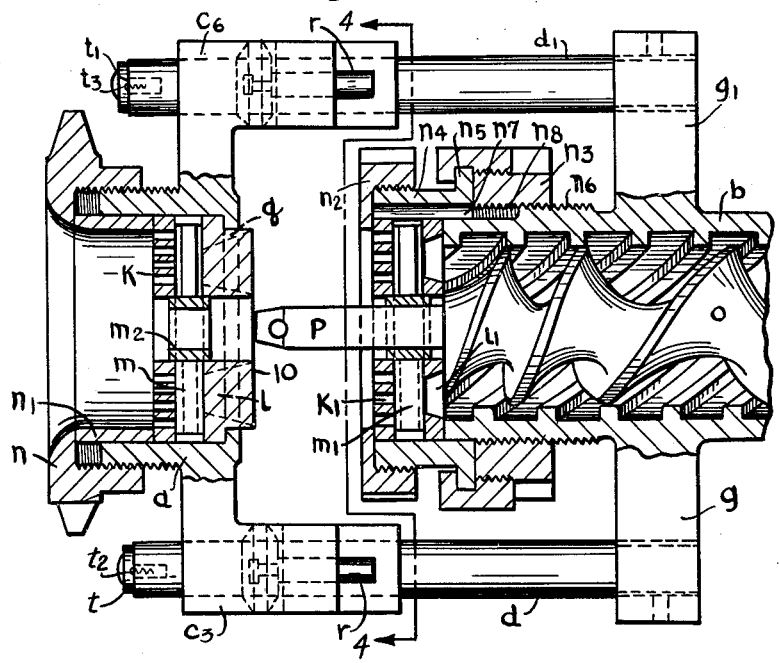
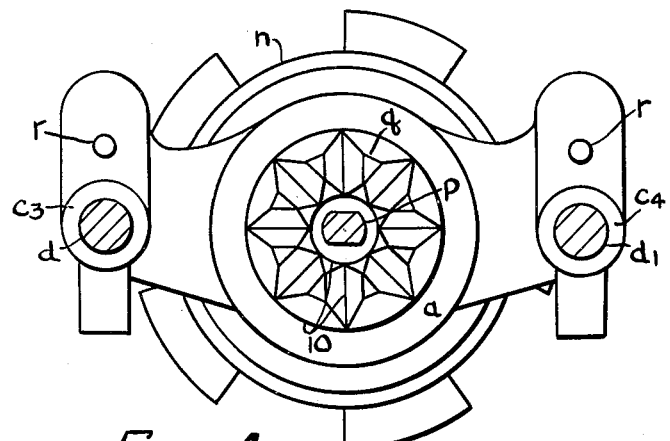

Patented May 23, 1950

2,509,002

UNITED STATES PATENT OFFICE 2,509,002

MEAT GRINDER

Martin Michael Peter Jorgensen, Copenhagen, Denmark

Application November 28, 1945, Serial No. 631,427
In Denmark October 25, 1944

Section 1, Public Law 690, August 8, 1946
Patent expires October 25, 1964

7 Claims. (Cl. 146—187)

The present invention relates to meat grinders, and the main object of the invention is to provide such a machine which when desired can deliver coarse ground or fine ground meat, and which is especially constructed for use in foodstuff shops.

More especially, the invention has for its object to provide a meat grinder of the kind referred to in which two sets of cutting tools are provided, and in which the meat can be arranged to pass either one set of cutting tools alone, or both sets of cutting tools.

A special object of the present invention is to provide a machine of the kind referred to in which the one set of cutting tools easily and quickly can be brought in or out of operation so that the machine can be converted by simple operation and the time during which the customer has to wait will not be longer if the machine must be converted before use.

A further object of the invention is to provide a machine of the kind referred to which is hygienic in use and simultaneously economic and which avoids any waste of meat.

Further objects of the invention are to provide simple robust constructive features by means of which the above named objects are obtained.

A special object is to provide a machine of the kind referred to in which the hygienic and economic advantages can be fully maintained, even if the machine must be readjusted when the cutting tools are worn so that even after the readjustment no space will be provided between the two sets of cutting tools in which partially ground meat will be left.

The invention will now be more specifically described with reference to the accompanying drawing, in which Fig. 1 is a side elevation of the front part of a machine according to the invention, adjusted for delivering coarse-ground meat, Fig. 2 is a side elevation of another form of the machine, adjusted for delivering fine-ground meat, Fig. 3, a sectional plan view of the machine shown in Fig. 1, and Fig. 4 is a sectional view along the line 4—4 of Fig. 3.

In the form shown in Figs. 1, 3 and 4 the meat grinder consists of a housing composed of two parts $a$ and $b$, of which the front part $a$ will be referred to in the following as front housing, whereas the rear part $b$ will be referred to as rear housing.

In the front housing as well as in the rear housing, cutting tools are mounted on a common through-going shaft $p$, Fig. 3, which tools consist in the front housing of a perforated disc $k$, a fixed cutting member $l$, and a rotating cutter $m$ disposed therebetween in advance of the perforated disk, and in the rear housing of corresponding members $k_1$, $l_1$, $m_1$. The cutting tools of the front housing are clamped together by means of a nut $n$ and a filler member $n_1$.

The cutting tools of the rear housing are clamped together by means of a ring $n_2$ threaded on a part $n_4$ of the housing $b$ so as to press the fixed cutting member $l_1$ against the end of the housing $b$. The cutting tools of the rear housing $b$ form a rear cutting head, and the tools of the front housing $a$ form another cutting head.

When using the ordinary filler rings for clamping the cutting tools together, a rather great space would be formed between the perforated disc $k_1$ of the rear housing and the fixed cutting member $l$ of the front housing. This space would be filled with ground meat which would remain there until meat is again fed into the machine. In order to avoid this inconvenience, the perforated disc $k_1$ should be disposed as closely as possible against the fixed cutting member $l$ when both sets of cutting tools are in use. In the form shown this is obtained through the member $n_4$, the so-called cutting chamber, being slidably mounted on the housing $b$. For this purpose the cutting chamber is provided with a flange $n_5$ engaging a corresponding groove in a nut $n_3$ which, by means of screw-threads $n_6$, may be screwed to and fro on the housing $b$.

In the cutting chamber a key member $n_7$ is provided, which in a well-known manner engages corresponding notches in the circumferences of the fixed cutting member $l_1$ and the perforated disc $k_1$, respectively, so as to hold the same against rotation relative to the cutting chamber $n_4$. According to the invention a similar notch $n_8$ is provided in the outside of the housing $b$, which is similarly engaged by the key member $n_7$ so as to hold the cutting chamber $n_4$ and, consequently, the fixed cutting member and the perforated disc against rotation relative to the housing $b$.

When the cutting tools $k_1$, $m_1$, $l_1$ are to be inserted in the cutting chamber $n_4$, the latter is adjusted by means of the nut $n_3$, suitably provided with projections on its circumference, in such a manner that the length of the cutting chamber is somewhat greater than the total thickness of the cutting tools. The cutting tools are now inserted, and the threaded ring $n_2$ is mounted. By means of the nut $n_3$ the length of the cutting chamber is now so adjusted that the cutting tools are clamped fixedly together against the end of the housing $b$.

The clamping-together of the cutting tools being thus not made in the ordinary manner through turning the threaded ring $n_2$, but by means of the nut $n_3$, the screw-threads of the threaded ring will be in so far superfluous as the thread will serve no more for adjustment, but only for fixing the ring to the cutting chamber. More easily operable fixing means, such as a bayonet lock, may, therefore, suitably be substituted for the screw-thread. The cutting chamber $n_4$, is, however, preferably provided with a so-called gun lock being constituted by a partially removed screw-thread. The internal thread of the ring $n_2$ is correspondingly formed. The mounting and dismounting of the ring $n_2$ is thus simply made by threading the ring over the end of the cutting chamber $n_4$ and turning it a fraction of a revoluton, e. g. ⅛ revolution.

For feeding the meat to be ground to the cutting tools of the rear housing $b$, a rotating worm $o$ is provided in the usual manner.

According to the invention the meat grinder is so made that the ground meat may, according to wish, leave the machine between the two sets of cutting tools in the form of coarse-ground meat or pass through both sets of cutting tools so as to be delivered as fine-ground meat.

In the form shown in Figs. 1, 3, and 4, this is obtained through the front housing $a$ being slidable in the direction of the shaft $p$. To this end the housing $b$ is provided with lateral projections $g$ and $g_1$, in which parallel guides $d$ and $d_1$, respectively, are fixed, the front housing $a$ being slidably mounted on said guides by means of bushings $c_3$ and $c_4$.

According to the invention self-locking friction locks are provided in the bushings $c_3$ and $c_4$, which in the form shown each consist of an apertured plate $h$, Fig. 1, threaded over the corresponding guide $d$ or $d_1$ and normally held in the inclined position shown in Fig. 1 by means of a spring so as to engage the guide with the edges of its aperture. By means of a pin $r$ the plate $h$ may, against the action of the spring $s$, be moved to a position approximately at right angles to the guide.

If the front housing is to be brought into its operating position it is simply pushed by hand against the rear housing so that the fixed cutting member $l$ will abut closely against the perforated disc $k_1$. This movement will meet with no resistance from the plates $h$, but if a pull away from the rear housing is exerted on the front housing, the plates $h$ will squeeze themselves to the guides $d$ and $d_1$ and prevent movement of the front housing away from the rear housing. The front housing will thus be held against the pressure exerted on the front housing by the meat entering the fixed cutting member $l$ through the perforated disc $k_1$. In order to remove the front housing from the rear housing it is only necessary to push the pins $r$ so as to relieve the friction lock.

The front housing being thus pressed against the rear housing only through the pressure of the hand, it is important to make provisions to avoid that leavings of meat which may have collected themselves on the outside of the perforated disc $k_1$ and the corners between the latter and the member $n_2$ will prevent the front housing from abutting closely against the rear housing. For this purpose the fixed cutting member $l$ extends outside the front housing $a$ with a peripheral sealing portion $q$, which is formed with sharp edges $lo$, which may easily penetrate the meat so as to abut against the perforated disc $k_1$. These sharp edges are suitably constituted by the lines of intersection of the sides of the funnel-shaped apertures in the fixed cutting member $l$.

For preventing the front housing from being unintendedly pulled over the end of the guides $d$ and $d_1$, the latter are, at their outer ends, provided with stop members $t$ and $t_1$ in the form of discs of approximately equal diameter with the guides, said discs being excentrically mounted on the guides, as shown in Fig. 1 and 3. If the front housing is to be removed, the discs $t$ and $t_1$ are swung to a position in which they are concentric with the guides. In this position they may be retained by small spring-actuated balls $t_2$ and $t_3$ engaging corresponding recesses in the discs $t$ and $t_1$. The front housing may now be slid over the end of the guides and thus removed.

The shaft $p$ of the worm $o$ has an oval cross section fitting in a correspondingly formed aperture in the cutters $m_1$ and $m$, but the shaft has such a length that, when the front housing is in the position shown in Fig. 1, the shaft will not engage the cutter $m$ so that the latter will not rotate and consequently generate no friction heat, which it would otherwise be impossible to lead away to a sufficient extent when no meat is passing the front housing. For location of the cutter $m$ centrally in the front housing the cutter is provided with cylindrical projections $m_2$ mounted in borings in the fixed cutting member $l$ and the perforated disc $k$.

The form shown in Fig. 2 differs from the form described above substantially through shafts $d_2$ being substituted for the guides $d$ and $d_1$. These shafts are rotatably mounted in bearings $c_2$ on the front housing, only one bearing being shown in the drawing. The shafts $d_2$ are, however, not slidable in these bearings, the shafts abutting against one side of the bearing with a flange $f$ and against the other side of the bearings with a nut $e$ threaded on the shaft.

The shafts $d_2$ are further guided in bearings $g_2$ on the sides of the rear housing $b$ so as to be rotatable as well as slidable in said bearings. For rotating and sliding the shaft $d_2$, handles 12 are provided thereon, for the passage of which during the sliding movements of the front housing the bearings $g_2$ are provided with slots $i$. For limiting the sliding movement of the front housing in its forward direction, the rear ends of the shafts $d_2$ are provided with abutments, one of which $t_5$ is shown in Fig. 2, and which, through co-operation with the bearings $g_2$ of the rear housing, will limit the actual movement of the shafts $d_2$.

As will be obvious from Fig. 2, the handles 12 suitably serve as locking means for the front housing and the rear housing when these are locked together. For this purpose the rear end of the slots $i$ of the bearings $g_2$ are formed with inclined faces 14, with which the handles co-act when being swung to the position shown in Fig. 2 for clamping the front housing and the rear housing together and locking them in this position. The clamping and locking mechanism shown thus in some respects resembles the cylinder lock of a Mauser rifle.

Obviously it will, by both forms shown, be possible in a simple and effective manner to slide the front housing $a$ to and fro so that the ground meat may, according to requirement, be delivered after having passed the cutting tools of the rear housing only, or after having passed both sets of cutting tools. If desired, the front housing may, during making coarse-ground meat, be completely removed from the machine, the front housing forming also in such case a self-contained unit, which may easily be mounted on the machine, when required.

The invention is not limited to the embodiments described above with reference to the accompanying drawing, but may be modified in various manners within the scope of the appended claims. Thus the front housing may be hinged to the rear housing in such a manner that, when the front housing is to be brought into operating position, it is swung away from the rear housing.

What I claim is:

1. Meat grinder comprising a housing, a rotatable worm in said housing, a first cutting chamber surrounding the delivery end of said housing, cutting means in said first cutting chamber comprising a knife and a perforated disc, a second cutting chamber in close relationship to the delivery end of said first cutting chamber, cutting means in said second cutting chamber comprising a knife and a perforated disc, a non-circular shaft extending from the delivery end of said worm through corresponding non-circular holes in the knives in said two cutting means, guiding rods mounted on said housing, bushings connected with said second cutting chamber surrounding said guiding rods, frictional discs arranged in said bushings surrounding said guiding rods, and slidable pins in said bushings engaging said frictional discs.

2. Meat grinder comprising a housing, a rotatable worm in said housing, a first cutting chamber surrounding the delivery end of said housing, cutting means in said first cutting chamber comprising a knife and a perforated disc, a second cutting chamber in close relationship to the delivery end of said first cutting chamber, cutting means in said second cutting chamber comprising a knife and a perforated disc, a non-circular shaft extending from the delivery end of said worm through corresponding non-circular holes in the knives in said two cutting means, guiding rods mounted on said housing, bushings connected with said second cutting chamber surrounding said guiding rods, frictional discs arranged in said bushings surrounding said guiding rods, slidable pins in said bushings engaging said frictional discs, and releasable stop members at the end of said guiding rods for limiting the movement of said bushings.

3. In a meat grinder designed to deliver selectively alternatively singly or twice ground meat, respectively, a housing, a feed device revolubly actuable in said housing, a cutting head removably mounted in said housing adjacent said feed device and including a perforated stationary disk and a revoluble cutter adjacent thereto and disposed in advance of said disk for co-action therewith, and means for transmitting rotation intermediate said feed device and cutter, in combination with, a second cutting head including a perforated disk and a revoluble cutter for co-action therewith, peripheral sealing means carried by said second cutting head, said second cutting head being normally shiftable between two positions of close proximity of said second head and in registry with said first for cooperating therewith and, respectively, of remoteness therefrom, means operative in said first position for coupling said cutters for rotation, whereby both cutting heads will be fed in succession by said feed device, said second head being spaced in said second position from said first head for a distance sufficient to allow discharging of meat between said cutting heads, whereby said first head only will be fed from said feed device and will operate alone, and rigid carrying means supported by said housing and supporting said second head for shiftably guiding the latter between said positions, said carrying means including releasable locking means operable for fixedly locking said heads in said first position.

4. In a meat grinder designed to deliver selectively alternatively singly or twice ground meat, respectively, a housing, a feed device revolubly actuable in said housing, a cutting head removably mounted in said housing adjacent said feed device and including a perforated stationary disk and a revoluble cutter adjacent thereto and disposed in advance of said disk for co-action therewith, and means for transmitting rotation intermediate said feed device and cutter, in combination with, a second cutting head including a perforated disk and a revoluble cutter for co-action therewith, peripheral sealing means carried by said second cutting head, said second cutting head being normally shiftable between an operating position wherein the two heads are registered in close proximity, and an inactive position, respectively, wherein the cutting heads are spaced apart for a distance sufficient to allow discharging of meat therebetween, means operative in said operating position for coupling said cutters for rotation, guiding means intermediate said housing and said second cutting head for shiftably guiding said second head between said positions and comprising a plurality of elements some of said elements associated with said housing and others associated with said second cutting head and including guiding rods and bearings slidable relative to each other, and releasable latching means operable to latch said second head fixedly in said operating position.

5. In a meat grinder designed to deliver selectively alternatively singly or twice ground meat, respectively, a housing, a feed device revolubly actuable in said housing, a cutting head removably mounted in said housing adjacent said feed device and including a perforated stationary disk and a revoluble cutter adjacent thereto and disposed in advance of said disk for co-action therewith, and means for transmitting rotation intermediate said feed device and cutter, in combination with, a second cutting head including a perforated disk and a revoluble cutter for co-action therewith, peripheral sealing means carried by said second cutting head, said second cutting head being normally shiftable between an operating position wherein the two heads are registered in close proximity, and an inactive position, respectively, wherein the cutting heads are spaced apart for a distance sufficient to allow discharging of meat therebetween, means operative in said operating position for coupling said cutters for rotation, guiding means intermediate said housing and said second cutting head for shiftably guiding said second head between said positions and comprising passage forming portions on said housing, at least two rods connected to said second cutting head and each slidably movable in a passage, and releasable latching means operable to latch said second head fixedly in said operating position.

6. In a meat grinder designed to deliver selectively alternatively singly or twice ground meat, respectively, a housing, a feed device revolubly actuable in said housing, a cutting head removably mounted in said housing adjacent said feed device and including a perforated stationary disk and a revoluble cutter adjacent thereto and disposed in advance of said disk for co-action therewith, and means for transmitting rotation intermediate said feed device and cutter, in combination with, a second cutting head including a perforated disk and a revoluble cutter for co-action therewith, peripheral sealing means carried by said second cutting head, said second cutting head being normally shiftable between two positions of close proximity of said second head and in registry with said first for cooperating therewith and, respectively, of remoteness therefrom, means operative in said first position for coupling said cutters for rotation, whereby both cutting heads will be fed in succession by said feed device, said second head being spaced in said second position from said first head for a distance sufficient to allow discharging of meat between said cutting heads, whereby said first head only will be fed from said feed device and will operate alone, and rigid carrying means including straight guiding rods secured to the exterior of said housing and adapted to support said second head sliding thereon for shiftably guiding the latter between said positions, and releasable locking means carried by said second cutting head operable to engage the surface of said rods for fixedly locking said heads in said first position.

7. In a meat grinder designed to deliver selectively alternatively singly or twice ground meat, respectively, a housing, a feed device revolubly actuable in said housing, a cutting head removably mounted against one end of said housing adjacent said feed device and including a perforated stationary disk and a revoluble cutter adjacent thereto and disposed in advance of said disk for co-action therewith, and means for transmitting rotation intermediate said feed device and cutter, adjustably movable means for holding said cutting head in place comprising a tube keyed for linear displacement axially of said housing and surrounding said cutting head and having a portion abutting from the outside against said perforated disk and an element threaded on said housing and having an annular groove, said tube having a flange disposed in said groove for displacement of said tube upon threading rotation of said element, a second cutting head including a perforated disk and a revoluble cutter for co-action therewith, peripheral sealing means carried by said second cutting head, said second cutting head being normally shiftable between two positions of close proximity of said second head and in registry with said first for cooperating therewith and, respectively, of remoteness therefrom, means operative in said first position for coupling said cutters for rotation, whereby both cutting heads will be fed in succession by said feed device, said second head being spaced in said second position from said first head for a distance sufficient to allow discharging of meat between said cutting heads, whereby said first head only will be fed from said feed device and will operate alone, and rigid carrying means supported by said housing and supporting said second head for shiftably guiding the latter between said positions, said carrying means including releasable locking means operable for fixedly locking said heads in said first position.

MARTIN MICHAEL PETER JORGENSEN.

REFERENCES CITED

The following references are of record in the file of this patent:

UNITED STATES PATENTS

| Number | Name | Date |
|---|---|---|
| 517,148 | Scheffel | Mar. 27, 1894 |
| 842,499 | Schmidt | Jan. 29, 1907 |
| 930,920 | Bartz | Aug. 10, 1909 |
| 2,075,603 | Dirr | Mar. 30, 1937 |
| 2,200,786 | Ardrey | May 14, 1940 |
| 2,229,845 | Gold | Jan. 28, 1941 |
| 2,284,722 | Burns | June 2, 1942 |

FOREIGN PATENTS

| Number | Country | Date |
|---|---|---|
| 440,697 | France | May 9, 1912 |
| 661,467 | France | Mar. 5, 1929 |
| 403,117 | Germany | Sept. 25, 1924 |